United States Patent
Fu et al.

(10) Patent No.: US 12,092,251 B1
(45) Date of Patent: Sep. 17, 2024

(54) SEWAGE PIPE HEATER FOR RECREATIONAL VEHICLE

(71) Applicant: Hangzhou Reyi Technology Co., Ltd., Hangzhou (CN)

(72) Inventors: Xiasheng Fu, Hangzhou (CN); Tiegen Li, Hangzhou (CN); Tonglin Liu, Hangzhou (CN)

(73) Assignee: Hangzhou Reyi Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/603,134

(22) Filed: Mar. 12, 2024

(51) Int. Cl.
   *F16L 53/30* (2018.01)
   *B60P 3/36* (2006.01)
   *B60R 15/04* (2006.01)

(52) U.S. Cl.
   CPC ............... *F16L 53/30* (2018.01); *B60P 3/36* (2013.01); *B60R 15/04* (2013.01)

(58) Field of Classification Search
   CPC .......... F16L 53/30; B60P 3/36; B60R 15/04
   USPC .......................................................... 138/32
   See application file for complete search history.

(56) References Cited

U.S. PATENT DOCUMENTS

| | | | | |
|---|---|---|---|---|
| 3,941,159 A | * | 3/1976 | Toll | B32B 1/08 428/920 |
| 4,142,565 A | * | 3/1979 | Plunkett, Sr. | F16L 59/026 150/156 |
| D288,594 S | * | 3/1987 | Christman | D23/318 |
| 4,930,543 A | * | 6/1990 | Zuiches | F16L 57/00 285/47 |
| 5,522,433 A | * | 6/1996 | Nygaard | F16L 59/02 138/128 |
| 6,820,639 B2 | * | 11/2004 | Petschek | F16L 59/161 138/149 |
| 6,907,907 B2 | * | 6/2005 | Maida | F16L 59/106 138/167 |
| 2014/0069540 A1 | * | 3/2014 | Chesnais | F16L 53/38 138/32 |
| 2019/0170283 A1 | * | 6/2019 | Amos | H05B 3/58 |

FOREIGN PATENT DOCUMENTS

| CN | 219713685 U | 9/2023 |
|---|---|---|
| CN | 219775988 U | 9/2023 |

* cited by examiner

*Primary Examiner* — David R Deal

(57) ABSTRACT

The invention discloses a sewage pipe heater for a recreational vehicle, comprising a heating sleeve main body and a heating assembly; the heating sleeve main body comprises an inner protective layer, a thermal insulation composite layer and an outer protective layer which are sequentially laminated; the heating assembly is arranged between the inner protective layer and the thermal insulation composite layer; the heating sleeve main body is in a sheet shape, and two side edges of the heating sleeve main body are provided with quick-release structures; and the two side edges of the heating sleeve main body are connected together through the quick-release structure to form a surrounding structure capable of being wrapped on a sewage pipe of the recreational vehicle.

10 Claims, 3 Drawing Sheets

SEWAGE PIPE HEATER FOR RECREATIONAL VEHICLE

TECHNICAL FIELD

The present invention belongs to the field of a thermal insulation and antifreezing technology for a sewage pipe, and more particularly, relates to a sewage pipe heater for a recreational vehicle.

BACKGROUND OF THE PRESENT INVENTION

With the continuous improvement of people's living standards, more and more people choose to travel by a recreational vehicle. For the recreational vehicle with a toilet, it is necessary to use a sewage pipe to lead excrement out to a black water tank; in addition, some black water tanks can directly discharge sewage into a sewage well of a recreational vehicle camp through the sewage pipe. However, when an outside air temperature is too low (for example, below 0° C.), liquid in the sewage pipe is easy to freeze, which leads to the blockage of the sewage pipe and affects a normal function thereof to discharge the sewage. Therefore, it is necessary to design a sewage pipe heater that can ensure the availability of a recreational vehicle sewage system in a severe environment.

SUMMARY OF THE PRESENT INVENTION

The present invention aims at providing a sewage pipe heater for a recreational vehicle.

The present invention provides a sewage pipe heater for a recreational vehicle, comprising a heating sleeve main body and a heating assembly; the heating sleeve main body comprises an inner protective layer, a thermal insulation composite layer and an outer protective layer which are sequentially laminated; the heating assembly is arranged between the inner protective layer and the thermal insulation composite layer; the heating sleeve main body is in a sheet shape, and two side edges of the heating sleeve main body are provided with quick-release structures; and the two side edges of the heating sleeve main body are connected together through the quick-release structure to form a surrounding structure capable of being wrapped on a sewage pipe of the recreational vehicle.

Preferably, the heating assembly adopts electric heating wires; and the electric heating wires are evenly distributed on the thermal insulation composite layer.

Preferably, the thermal insulation composite layer comprises an insulation layer and a thermal insulation layer. The insulation layer is located at one side of the thermal insulation layer close to the inner protective layer.

Preferably, the thermal insulation composite layer further comprises a tin foil layer; the tin foil layer is arranged between the insulation layer and the thermal insulation layer; and the insulation layer, the tin foil layer and the thermal insulation layer are fixed together through hot pressing.

The electric heating wires are adhered to a side surface of the insulation layer facing the inner protective layer through a waterproof insulated rubber tape, and are completely covered by the waterproof insulated rubber tape.

Preferably, the electric heating wires are arranged in a snake shape, and comprise a plurality of straight line segments and a plurality of arc connecting segments which are alternately connected in turn; and the straight line segments are parallel to each other, and a distance between any two adjacent straight line segments is equal.

Preferably, further comprising a power supply plug; the power supply plug is connected with the heating assembly through a cable; and the power supply plug is used for being plugged into an external power supply to supply power to the heating assembly.

Preferably, a manual switch and an overcurrent protector are arranged in series on a cable between the power supply plug and the heating assembly; and the manual switch and the overcurrent protector both can cut off the electrical connection between the power supply plug and the heating assembly.

Preferably, the sewage pipe heater for the recreational vehicle further comprises a temperature control switch. The temperature control switch is arranged between the power supply plug and the heating assembly; and the temperature control switch is on or off with a change of an ambient temperature. The temperature control switch is in an on state, and when the ambient temperature rises to greater than or equal to C), the temperature control switch is switched to an off state; the temperature control switch is in the off state, and when the ambient temperature rises to less than or equal to $C_2$, the temperature control switch is switched to the on state; and a value of $C_1$ is from 10° C. to 14° C., and a value of $C_2$ is from 3° C. to 7° C.

Preferably, both the inner protective layer and the outer protective layer are made of nylon cloth, and side surfaces of the inner protective layer and the outer protective layer are provided with waterproof coatings.

Preferably, the thermal insulation layer is made of thermal insulation cotton.

Preferably, the quick-release structure adopts a hook-loop.

The present invention has the beneficial effects.

1. The sewage pipe heater for the recreational vehicle provided by the present invention is in the sheet shape and is wrapped around a sewage pipe of the recreational vehicle, and then the sewage pipe is heated by heating wires, so that frozen sewage in the sewage pipe of the recreational vehicle is melted, and an inside of the sewage pipe of the recreational vehicle is kept from freezing for a long time, thus ensuring that the sewage pipe of the recreational vehicle is unblocked, and a recreational vehicle sewage system is used normally in a severe environment.

2. According to the present invention, the electric heating wires are arranged between the insulation layer and the waterproof insulated rubber tape, so that the electric heating wires are fully isolated from an external environment, thereby avoiding a risk of electric leakage. In addition, the thermal insulation layer is arranged on an outer side of the insulation layer in the present invention, so that a heat loss can be effectively reduced and energy consumption of the present invention can be reduced.

3. According to the present invention, the insulation layer, the tin foil layer and the thermal insulation layer are fixed together through hot pressing, so that only three structure layers need to be laminated together when assembling the heating sleeve main body, which is conducive to reducing the complexity of a production process, thereby further reducing a production cost.

4. A whole structure of the present invention is in the sheet shape, and a size thereof can be adaptively adjusted according to an actual sewage pipe size in the American market or provide a variety of different specifications, thus improving the adaptability of the present invention.

5. The hook-loops are arranged on both sides of the heating sleeve main body, so that the both sides of the heating sleeve main body can be quickly fixed after the heating sleeve main body finishes wrapping the sewage pipe. Therefore a user can quickly install the heating sleeve main body in a cold weather. Meanwhile, the hook-loops can adjust the tightness of the heating sleeve body by changing a pasting position, so as to ensure the tightness of the heating sleeve main body wrapping the sewage pipe.

Numeral references: 1 refers to heating sleeve main body; 1-1 refers to inner protective layer; 1-2 refers to insulation layer; 1-3 refers to thermal insulation layer; 1-4 refers to outer protective layer; 1-5 refers to waterproof insulated rubber tape; 2 refers to heating assembly; 3 refers to power supply plug; 4 refers to quick-release structure; and 5 refers to sewage pipe of recreational vehicle.

DETAILED DESCRIPTION OF PREFERRED EMBODIMENTS

The present invention is further described in conjunction with the accompanying drawings.

Figure 1:
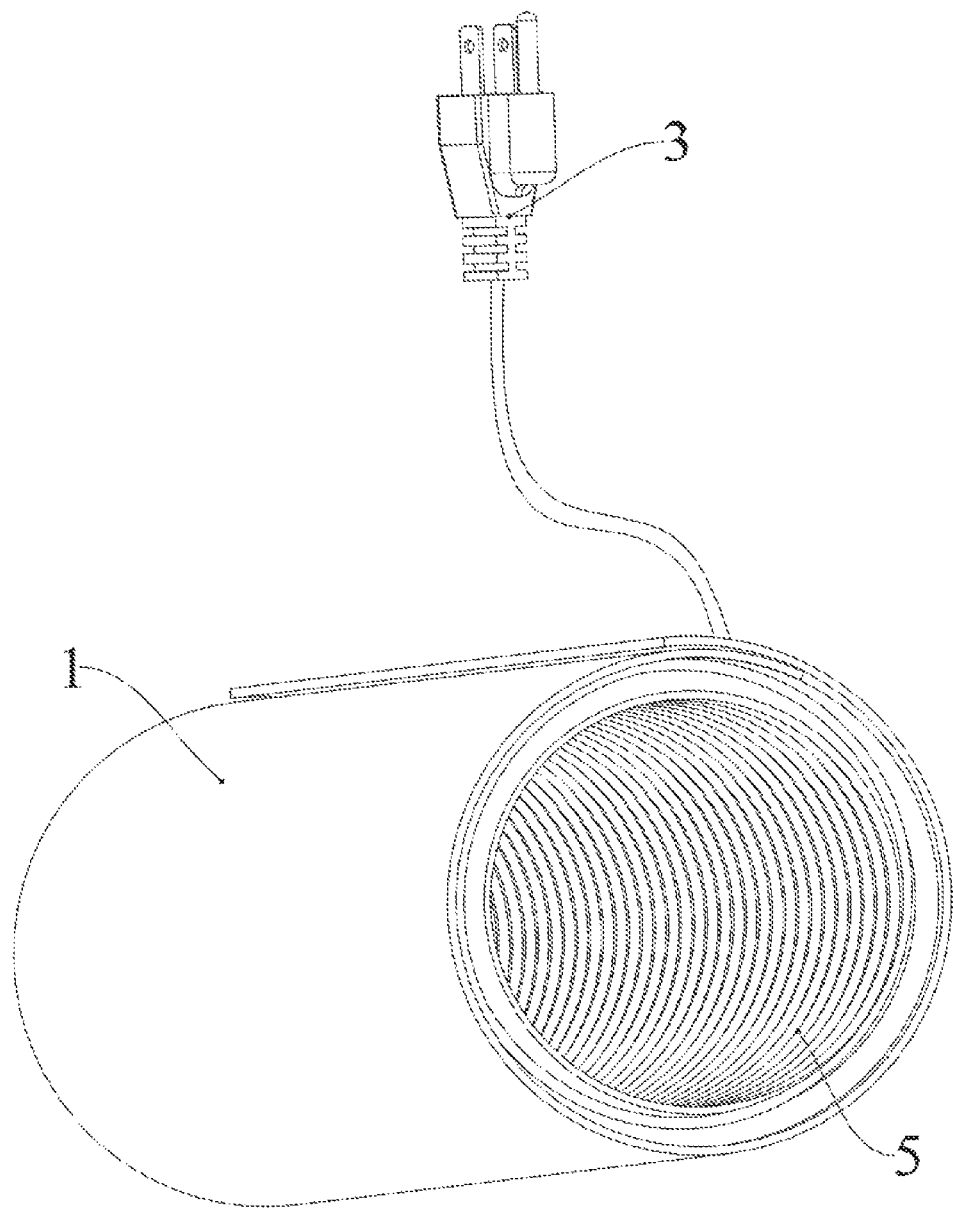
FIG. 1 is a schematic diagram of a whole structure according to the present invention.
Figure 2:
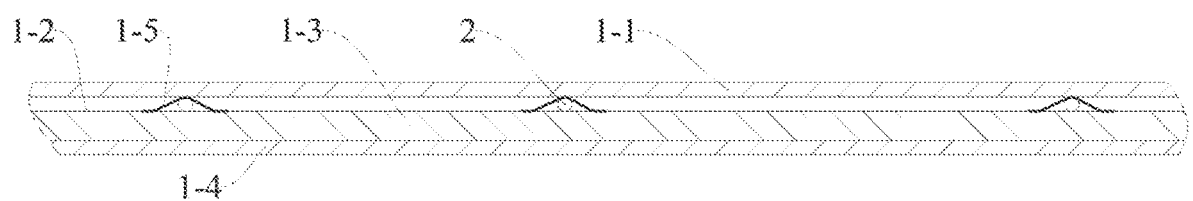
FIG. 2 is a side sectional view of a heating sleeve main body in an unfolded state according to the present invention.

As shown in FIG. 1 and FIG. 2, a sewage pipe heater for a recreational vehicle comprises a heating sleeve main body 1 and a heating assembly 2. The heating sleeve main body 1 comprises an inner protective layer 1-1, a thermal insulation composite layer and an outer protective layer 1-4 which are sequentially laminated from inner to outer. The thermal insulation composite layer comprises an insulation layer 1-2, a tin foil layer and a thermal insulation layer 1-3 which are sequentially laminated from inner to outer. The insulation layer 1-2, the tin foil layer and the thermal insulation layer 1-3 are fixed together through hot pressing, which can improve the convenience of assembling each layer structure of the sewage pipe heater for the recreational vehicle. The tin foil layer is used to function as a tin foil layer.

The heating assembly 2 is arranged between the inner protective layer 1-1 and the insulation layer 1-2 for providing heat to the sewage pipe of the recreational vehicle. When in use, an inner side surface of the heating sleeve main body 1 is attached to an outer wall of the sewage pipe of the recreational vehicle. Two side edges of the heating sleeve main body 1 are provided with quick-release structures 4, so that the heating sleeve main body 1 can be quickly wrapped and fixed on the outer wall of the sewage pipe of the recreational vehicle. Both the inner protective layer 1-1 and the outer protective layer 1-4 are made of waterproof nylon cloth, which can protect the heating assembly and play a preliminary waterproof role. The inner protective layer 1-1 and the outer protective layer 1-4 are realized to be waterproof by arranging waterproof coatings on both side surfaces of the nylon cloth or by arranging waterproof coating only on the side surface facing away from the heating assembly. In addition, the rougher waterproof nylon cloth can improve the stability of the heating sleeve main body on the sewage pipe of the recreational vehicle, thereby preventing the heater from slipping off the sewage pipe. The thermal insulation layer 1-3 is filled with thermal insulation cotton. The thermal insulation layer 1-3 can slow down the heat loss of the sewage pipe.

Figure 3:
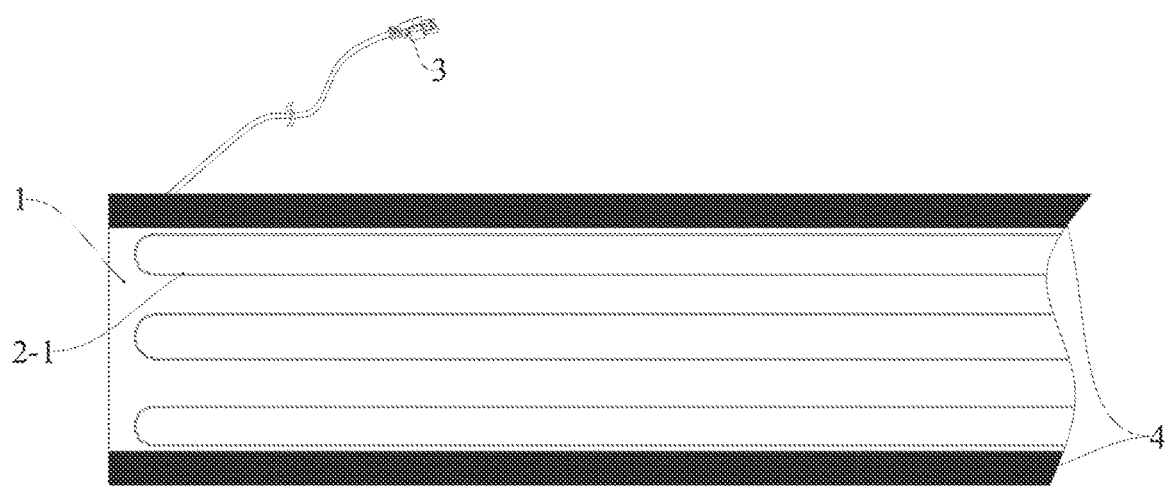
FIG. 3 is a schematic diagram of arrangement of a heating assembly according to the present invention.

As shown in FIG. 3, the heating assembly adopts electric heating wires; and the electric heating wires are evenly distributed on an inner side surface of the thermal insulation composite layer. The electric heating wires are adhered to the insulation layer 1-2 of the thermal insulation composite layer through a waterproof insulated rubber tape 1-5, and are completely covered by the waterproof insulated rubber tape 1-5. The electric heating wires are arranged in a snake shape and comprise a plurality of straight line segments and a plurality of arc connecting segments which are alternately connected in turn; and the straight line segments are parallel to each other, and a distance between any two adjacent straight line segments is equal. In a working process, the electric heating wires are connected to a power supply through the power supply plug 3 to provide heat for the sewage pipe of the recreational vehicle. A manual switch and an overcurrent protector are arranged in series on a cable between the power supply plug 3 and the heating assembly; and the manual switch and the overcurrent protector both can cut off the electrical connection between the power supply plug and the heating assembly. The manual switch is used for manually turning off the heating assembly; and the overcurrent protector is used for automatically cutting off a circuit when the heating assembly is subjected to short circuit and other dangerous situations, so as to ensure safety.

In some embodiments, the waterproof insulated rubber tape 1-5 is made of a mylar tape, which has the characteristics of high temperature resistance (capable of resisting a temperature above 150° C.), smooth surface, aging resistance and corrosion resistance.

In some embodiments, a temperature control switch is connected between the electric heating wire and the power supply plug. The temperature control switch is on or off with a change of an ambient temperature. The temperature control switch is in an on state, and when the ambient temperature rises to greater than or equal to $C_1$, the temperature control switch is switched to an off state; the temperature control switch is in the off state, and when the ambient temperature rises to less than or equal to $C_2$, the temperature control switch is switched to the on state; and a value of $C_1$ is from 10° C. to 14° C., and a value of $C_2$ is from 3° C. to 7° C. Therefore, the sewage pipe heater for the recreational vehicle can be automatically turned on and off according to the temperature.

The outer protective layer 1-4 is wrapped around the outer side of the heating assembly 2. The inner side surface of the outer protective layer 1-4 is attached to each heating wire. The outer protective layer 1-4 is used to prevent the heating assembly 2 from being damaged during transportation.

Figure 4:
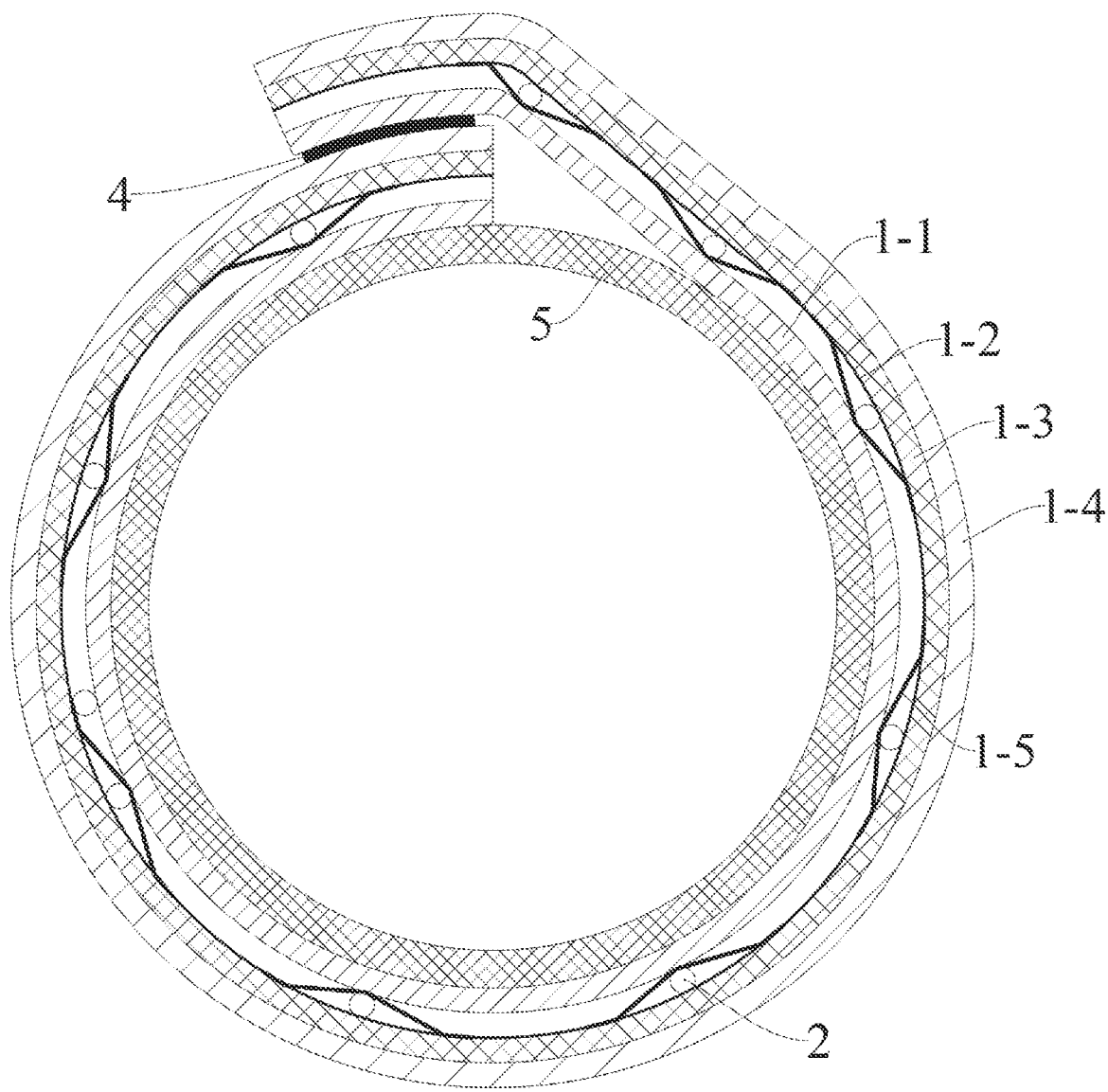
FIG. 4 is a schematic cross-sectional diagram of the present invention wrapped on a sewage pipe of the recreational vehicle.

As shown in FIG. 3 and FIG. 4, the quick-release structure 4 adopts a hook-loop; the hook-loop is divided into a hooked hook-loop and a hairy hook-loop; the hooked hook-loop and the hairy hook-loop are respectively fixed on the two side edges of the heating sleeve main body 1; and the hooked hook-loop is located on the outer side surface of the heating sleeve main body 1, and the hairy hook-loop is located on the inner side surface of the heating sleeve main body 1.

A working principle of the present invention is as follows.

When the external environment is low (judging by whether the water in an exposed pipeline of the recreational vehicle is frozen), the heating sleeve main body 1 is wrapped on the outside of the sewage pipe of the recreational vehicle;

the power supply plug 3 is connected to the power supply of the recreational vehicle, so that the electric heating wire can raise a temperature inside the sewage pipe of recreational vehicle, which avoids a problem of poor sewage discharge in a recreational vehicle toilet caused by inside freezing of the sewage pipe of the recreational vehicle.

We claim:

1. A sewage pipe heater for a recreational vehicle, comprising a heating sleeve main body (1) and a heating assembly (2), wherein the heating sleeve main body (1) comprises an inner protective layer (1-1), a thermal insulation composite layer and an outer protective layer (1-4) which are sequentially laminated; the heating assembly (2) is arranged between the inner protective layer (1-1) and the thermal insulation composite layer; the heating sleeve main body (1) is in a sheet shape, and two side edges of the heating sleeve main body are provided with quick-release structures (4); and the two side edges of the heating sleeve main body (1) are connected together through the quick-release structure to form a surrounding structure capable of being wrapped on a sewage pipe of the recreational vehicle;

wherein the thermal insulation composite layer comprises an insulation layer (1-2) and a thermal insulation layer (1-3), and the insulation layer (1-2) is located at one side of the thermal insulation layer (1-3);

wherein the thermal insulation layer (1-3) is made of thermal insulation cotton.

2. The sewage pipe heater for the recreational vehicle according to claim 1, wherein the heating assembly (2) adopts electric heating wires; and the electric heating wires are evenly distributed on the thermal insulation composite layer.

3. The sewage pipe heater for the recreational vehicle according to claim 2, wherein the electric heating wires are arranged in a snake shape, and comprise a plurality of straight line segments and a plurality of arc connecting segments which are alternately connected in turn; and the straight line segments are parallel to each other, and a distance between any two adjacent straight line segments is equal.

4. The sewage pipe heater for the recreational vehicle according to claim 1, wherein the thermal insulation composite layer further comprises a tin foil layer; the tin foil layer is arranged between the insulation layer (1-2) and the thermal insulation layer (1-3);

and the insulation layer (1-2), the tin foil layer and the thermal insulation layer (1-3) are fixed together through hot pressing.

5. The sewage pipe heater for the recreational vehicle according to claim 1, wherein the electric heating wires are adhered to a side surface of the insulation layer (1-2) facing the inner protective layer (1-1) through a waterproof insulated rubber tape, and are completely covered by the waterproof insulated rubber tape.

6. The sewage pipe heater for the recreational vehicle according to claim 1, further comprising a power supply plug (3), wherein the power supply plug (3) is connected with the heating assembly (2) through a cable; and the power supply plug (3) is used for being plugged into an external power supply to supply power to the heating assembly (2).

7. The sewage pipe heater for the recreational vehicle according to claim 6, wherein a manual switch and an overcurrent protector are arranged in series on a cable between the power supply plug and the heating assembly.

8. The sewage pipe heater for the recreational vehicle according to claim 6, further comprising a temperature control switch, wherein the temperature control switch is arranged between the power supply plug and the heating assembly, the temperature control switch is on or off with a change of an ambient temperature, the temperature control switch is in an on state, and when the ambient temperature rises to greater than or equal to $C_1$, the temperature control switch is switched to an off state; and the temperature control switch is in the off state, and when the ambient temperature rises to less than or equal to $C_2$, the temperature control switch is switched to the on state; and a value of $C_1$ is from 10° C. to 14° C., and a value of $C_2$ is from 3° C. to 7° C.

9. The sewage pipe heater for the recreational vehicle according to claim 1, wherein both the inner protective layer (1-1) and the outer protective layer (1-4) are made of nylon cloth, and side surfaces of the inner protective layer and the outer protective layer are provided with waterproof coatings.

10. The sewage pipe heater for the recreational vehicle according to claim 1, wherein the quick-release structure (4) adopts a hook-loop.

* * * * *